(12) United States Patent
Terashima et al.

(10) Patent No.: US 7,770,105 B2
(45) Date of Patent: *Aug. 3, 2010

(54) COMMUNICATION APPARATUS, SYSTEM AND WEB PAGE PROCESSING METHOD

(75) Inventors: Yoshiki Terashima, Yokohama (JP); Keiichi Teramoto, Kawasaki (JP); Takeshi Saito, Tokyo (JP); Yuzo Tamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 754 days.

This patent is subject to a terminal disclaimer.

(21) Appl. No.: 11/790,007

(22) Filed: Apr. 23, 2007

(65) Prior Publication Data

US 2007/0198909 A1 Aug. 23, 2007

Related U.S. Application Data

(63) Continuation of application No. 10/412,292, filed on Apr. 14, 2003, now Pat. No. 7,210,101.

(30) Foreign Application Priority Data

Apr. 15, 2002 (JP) ............................. 2002-112338

(51) Int. Cl.
  *G06F 17/00* (2006.01)
(52) U.S. Cl. ..................... 715/234; 715/240; 715/249
(58) Field of Classification Search ................. 715/234, 715/240, 249
  See application file for complete search history.

(56) References Cited

U.S. PATENT DOCUMENTS

| | | | |
|---|---|---|---|
| 6,029,135 | A | 2/2000 | Krasle |
| 6,157,705 | A | 12/2000 | Perrone |
| 6,266,809 | B1 | 7/2001 | Craig et al. |
| 6,289,462 | B1 * | 9/2001 | McNabb et al. ................ 726/21 |
| 6,377,928 | B1 | 4/2002 | Saxena et al. |
| 6,442,285 | B2 * | 8/2002 | Rhoads et al. .............. 382/100 |

(Continued)

FOREIGN PATENT DOCUMENTS

JP 10-154063 6/1998

(Continued)

OTHER PUBLICATIONS web.archive.org/web/20000817101941/www13.w3.org/TR/multimodal-reqs, as it appeared on Aug. 17, 2000.

(Continued)

*Primary Examiner*—Doug Hutton
*Assistant Examiner*—Benjamin J Smith
(74) *Attorney, Agent, or Firm*—Finnegan, Henderson, Farabow, Garrett & Dunner, L.L.P.

(57) ABSTRACT

An apparatus and method for processing a Web page is disclosed. A Web processing unit receives a first Web page from a Web server and displays the first Web page on a screen. The Web processing unit acquires a communication program identified by the first Web page. An external state is monitored and thereby operation information responsive to the external state is generated. The Web processing unit executes the communication program to change the first Web page displayed on the screen to a second Web page according to the operation information.

6 Claims, 12 Drawing Sheets

U.S. PATENT DOCUMENTS

| | | | |
|---|---|---|---|
| 6,604,076 B1 | 8/2003 | Holley et al. | |
| 6,636,831 B1 | 10/2003 | Profit et al. | |
| 6,650,761 B1 * | 11/2003 | Rodriguez et al. | 382/100 |
| 6,909,921 B1 * | 6/2005 | Bilger | 700/19 |
| 6,915,336 B1 | 7/2005 | Hankejh et al. | |
| 6,993,417 B2 * | 1/2006 | Osann, Jr. | 700/291 |
| 7,293,236 B2 * | 11/2007 | Choi et al. | 715/734 |
| 7,383,036 B2 * | 6/2008 | Kang | 455/414.1 |
| 7,565,294 B2 * | 7/2009 | Rhoads | 704/270 |
| 7,606,898 B1 * | 10/2009 | Hunt et al. | 709/225 |
| 2001/0034754 A1 * | 10/2001 | Elwahab et al. | 709/201 |
| 2002/0012443 A1 * | 1/2002 | Rhoads et al. | 382/100 |
| 2002/0034980 A1 * | 3/2002 | Lemmons et al. | 463/40 |
| 2002/0062216 A1 | 5/2002 | Guenther et al. | |
| 2003/0061380 A1 * | 3/2003 | Saito et al. | 709/238 |
| 2003/0066085 A1 * | 4/2003 | Boyer et al. | 725/104 |
| 2003/0086338 A1 * | 5/2003 | Sastry et al. | 368/10 |
| 2003/0156130 A1 | 8/2003 | James et al. | |

FOREIGN PATENT DOCUMENTS

| | | |
|---|---|---|
| JP | 10-222342 | 8/1998 |
| JP | 2001-339762 | 12/2001 |

OTHER PUBLICATIONS www.w3.org/Voice/Guide, as it appeared on Nov. 14, 2001.

Japanese Office Action for counterpart Japanese Patent Application No. 2002-112338, mailed Sep. 26, 2006.

Mai ODA, "Recommendation of eSuite DevPack R1.5 Trial Version," Notes Magazine, Softbank Corp., Feb. 13, 1999, No. 28, pp. 85-89 (CS-ND-1999-480-21).

Notification of Reasons for Rejection issued by the Japanese Patent Office, mailed Jan. 9, 2007, in Japanese Application No. 2002-112338 and English translation of Notification.

Notification of Reasons for Rejection for counterpart Japanese Patent Application No. 2007-150908, mailed Aug. 21, 2007.

\* cited by examiner

COMMUNICATION APPARATUS, SYSTEM AND WEB PAGE PROCESSING METHOD

CROSS-REFERENCE TO RELATED APPLICATIONS

This is a continuation of application Ser. No. 10/412,292, filed Apr. 14, 2003, now U.S. Pat. No. 7,210,101. U.S. patent application Ser. No. 10/412,292 based upon and claims the benefit of priority from the prior Japanese Patent Application No. 2002-11238, filed Apr. 15, 2002, the entire contents of the above which are incorporated herein by reference.

BACKGROUND OF THE INVENTION

1. Field of the Invention

The present invention relates to a communication apparatus having a function of acquiring a Web page via the Internet, a system, and a Web page processing method.

2. Description of the Related Art

In recent years, digital electric household appliances have become increasingly popular. Such conventional digital household appliances are mainly so-called "stand-alone" devices such as a digital TV, a DVD player and an MP3 player. However, more attention has recently been given to a category called "network electric household appliances." The network electric household appliances sharply differ from the conventional electric household appliances in that they are mainly Internet-capable household devices. This means that Internet technology, whose main platform has been personal computers, begins to be used in the field of electric household appliances. In near future, Internet technology and personal-computer technology would be positively applied to the field of digital electric household appliances.

Technology of so-called Web browser is very prevalent in the technical field of personal computers and the Internet. Web browsers are now introduced not only into personal computers but also into most types of mobile phones and some types of televisions. It is widely recognized that the range of applications of Web browsers is very wide. It is expected that Web browser techniques will be applied very widely to electric household appliance controllers, remote controllers, etc.

One of Web browser techniques, which has drawn special attention, is Java®. As is well known, the use of Java® can remarkably enhance the performance of expression on the screen displayed on the Web browser, and can realize display as if a computer application were running on the Web browser.

However, with increasing popularization of Internet-capable digital household appliances in the future, it will become necessary to harmoniously associate various functions required for digital household appliances, such as "voice recognition", "speech synthesis", "odor recognition" and "emotion recognition", with network functions or Web browser functions. These functions need to be dynamically applied to the network household appliances and Web browsers in the future.

BRIEF SUMMARY OF THE INVENTION

The present invention has been made in consideration of the above circumstances, and its object is to provide a communication apparatus, system, and method capable of performing processing on a Web page in response to information relating to an external condition.

According to one aspect of the present invention, there is provided an apparatus for processing a Web page. A Web processing unit receives a first Web page from a Web server and displays the first Web page on a screen. The Web processing unit acquires a communication program identified by the first Web page. An external state is monitored and thereby operation information responsive to the external state is generated. The Web processing unit executes the communication program to change the first Web page displayed on the screen to a second Web page according to the operation information.

In one embodiment of the present invention, the communication apparatus can perform a process relating to a Web page in response to information relating to the external state. A user, for example, may create a desired state as an external state and cause the communication apparatus to recognize the desired state, instead of effecting desired input using a mouse or a keyboard, thereby causing the communication apparatus to perform a predetermined process relating to a Web page.

In the other embodiment of the present invention, in a case where a server located at a place remote from the communication apparatus is provided with a function of acquiring information relating to an external state, the communication apparatus can perform a process relating to a Web page, in response to the information on the external state at the remote place.

DETAILED DESCRIPTION OF THE INVENTION

Embodiments of the present invention will now be described with reference to the accompanying drawings.

Figure 1:
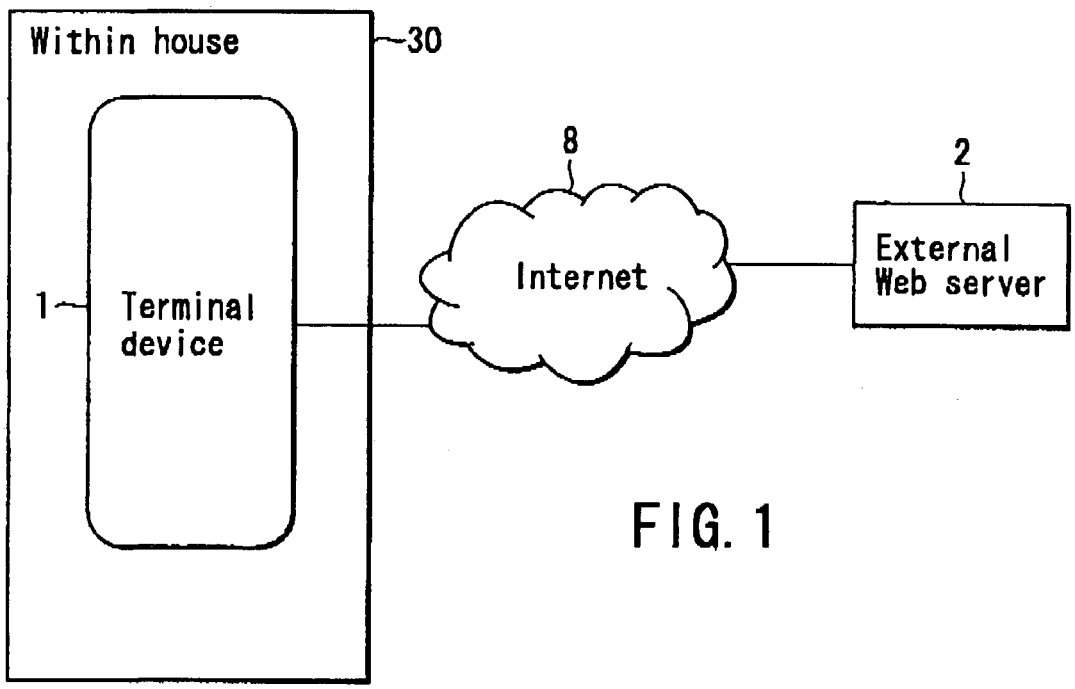
FIG. 1 shows an example of the structure of a whole network system according to an embodiment of the present invention.

FIG. 1 shows an example of the structure of a whole network system according to an embodiment of the present invention.

In the example shown in FIG. 1, a terminal device (or a communication apparatus) 1 (e.g. a household appliance controller functioning as a mediator for controlling or monitoring a network electric household appliance connected to a household network) is connected to a household network (not shown) provided in a house (30). The household terminal device 1 is communicable via the household network with, e.g. a server connected to the Internet 8 (directly or via a LAN).

In FIG. 1, one or more other devices (e.g. another household appliance controller, a network household appliance, etc.) may be connected to the household network in the house (30). The household network may be a wired network, a wireless network, or a wired/wireless hybrid network (in the case of the wired/wireless hybrid network, a device connected to the household network may have only a wired-communication interface, or only a wireless communication interface, or both wired and wireless communication interfaces).

On the other hand, in the example of FIG. 1, a Web server 2, which is disposed outside the house, is connected to the Internet 8. Of course, another server or a router may be connected to the Internet B.

In the present embodiment, the household terminal device 1 has a function (a processing engine (e.g. a voice recognition engine)) of acquiring information relating to an external condition (e.g. a word (a recognition of a word) spoken by a user), on the basis of information received through an interface with the outside (e.g. a microphone, a camera, a device detecting a physical quantity, such as an odor sensor). In response to the information relating to the external condition, the terminal device 1 can perform processing on a Web page. According to this function, for example, the user may create a desired state as an external state (intentionally or non-intentionally) instead of performing a desired input operation using a mouse or a keyboard, thereby causing the terminal device 1 to recognize the external state (e.g. a character string, which the user desires to select, generated). Thus, the terminal device 1 is caused to perform a predetermined process relating to a Web page. In the description that follows, the household terminal device 1 is provided with a voice recognition function (voice recognition engine) by way of example. Using the voice recognition function, the user of the terminal device 1 inputs voice to the terminal device 1 (instead of manually inputting an URL of a Web page that the use wishes to access, or a corresponding character string), thus becoming able to perform Web surfing. In the case where one or more devices, other than the terminal device 1, are connected in the house, some or all of these devices may have the same function.

In the example shown in FIG. 1, the household terminal device 1 communicates with the external Web server 2 connected to the Internet 8.

Figure 2:
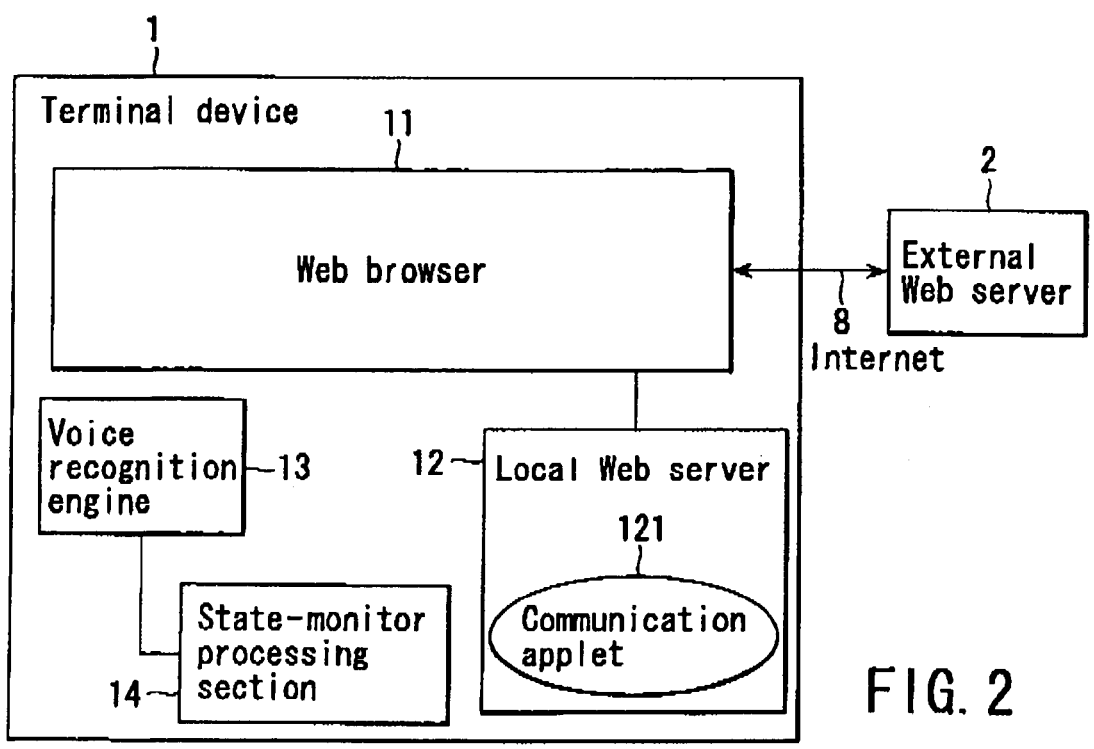
FIG. 2 shows an example of the internal structure of a household terminal device according to the embodiment.

FIG. 2 shows an example of the internal structure of the household terminal device 1 according to the embodiment of the invention.

As is shown in FIG. 2, the household terminal device 1 (in the case of performing voice recognition for acquiring information relating to an external state) comprises a Web browser 11, a local Web server 12, a voice recognition engine 13 and a state-monitor processing section 14. Each of the Web browser 11, local Web server 12, voice recognition engine 13 and state-monitor processing section 14 can be realized by a program (or by causing a CPU to execute a program). In addition, some or all of them can be realized by hardware such as semiconductor integrated circuits. In FIG. 2, an input device, a display, a communication apparatus, etc. are omitted.

The Web browser 11 is, for instance, a browser capable of letting a user view HTML Web pages (e.g. a Java®-capable Web browser in the case of using a Java® applet as a communication applet to be described later).

The Web browser 1 has a function of communicating with the local Web server 12, external Web server 2, etc. according to HTTP. In the present embodiment, it is assumed that the Web browser 11 and local Web server 12 are built in the same terminal device 1. Alternatively, they may be provided in separate devices connected via a household network (not shown). (In the former case, intra-apparatus communication (e.g. inter-process communication) is performed, whereas in the latter case communication is performed via a household network.)

The voice recognition engine 13 (as an example of the processing engine) functions as follows. The voice recognition engine 13 receives voice from a voice microphone (not shown) built in the terminal device 1 or externally connected via a connection terminal of the terminal device 1. Only a meaningful portion of the user's voice is extracted by voice recognition (preferably, high-quality voice recognition) using an internal dictionary (not shown). The extracted result is output as a character string (e.g. a character string of Japanese text).

In response to a request from a communication applet (to be described later), the state-monitor processing section 14 acquires a processed result of the processing engine (voice recognition engine 13 in this embodiment) provided in the terminal device 1, and returns the acquired processed result to the requesting side. In this embodiment, the state-monitor processing section 14 acquires a word, which has been immediately previously recognized by the voice recognition engine 13, as a character string.

The local Web server 12 is, for example, a Web server which is set to be able to accept an access from the Web browser 11. The local Web server 12 pre-stores a communication applet (e.g. Java® applet) 121. The communication applet 121 in this embodiment has a function of communicating with the state-monitor processing section 14 and being capable of receiving the processed result (in this embodiment, a character string recognized by the voice recognition engine 13) of the processing engine which the state-monitor processing section 14 acquires from the processing engine.

In the case where the local Web server 12 and Web browser 11 are built in the same terminal device 1, the local Web server 12 may be configured to accept only access from the Web browser 11 embedded in the same terminal device 1 (in other words, in the case where the local Web server 12 and Web browser 11 are built in the same terminal device 1, the local Web server 12 may be set such that it cannot accept access from a device other than the same terminal device 1).

On the other hand, the external Web server 2 shown in FIG. 1 stores Web pages which are assumed to be sent to a terminal such as household terminal device 1.

Figure 3:
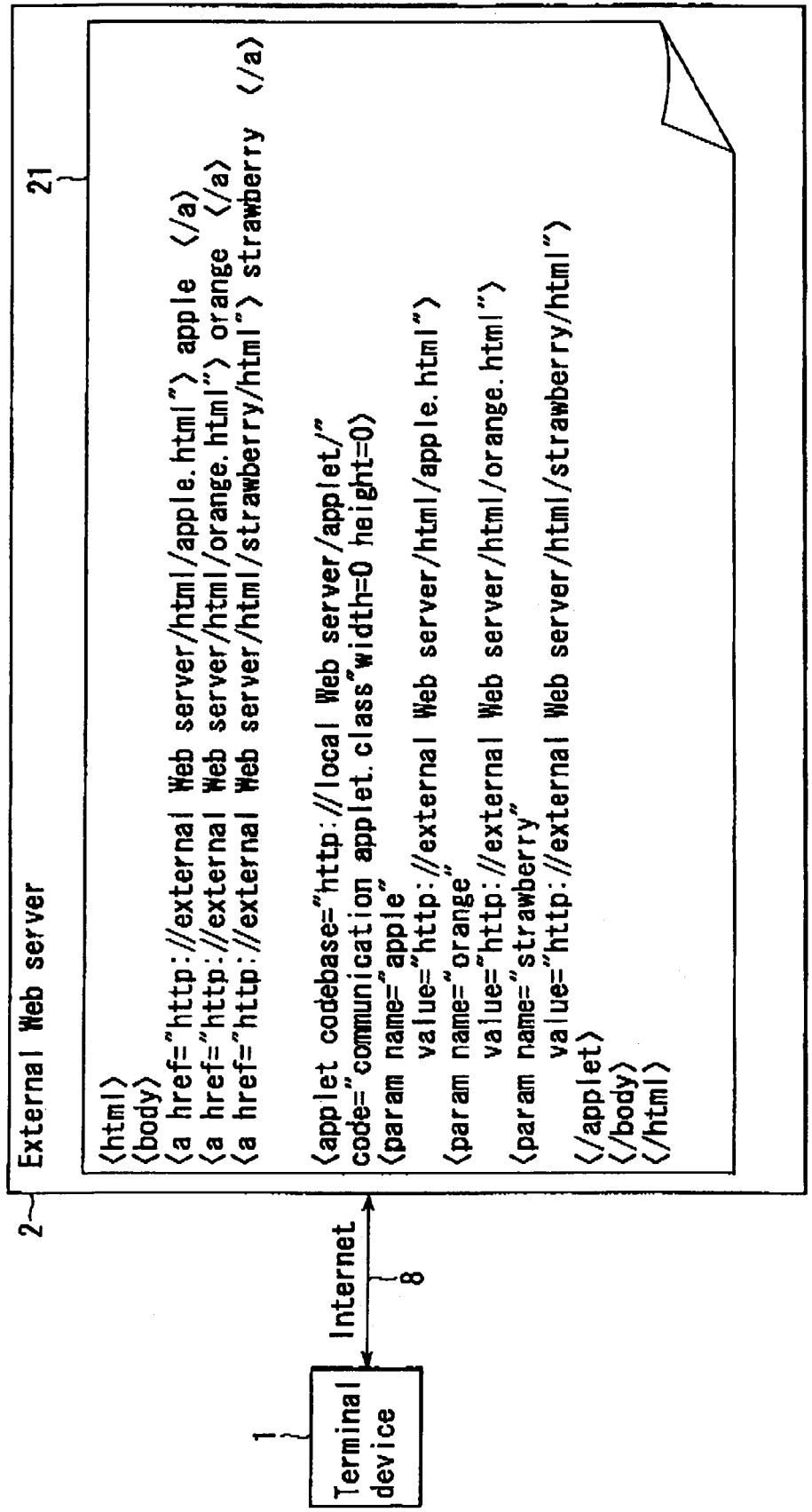
FIG. 3 shows an example of a Web page according to the embodiment.

It is assumed that these Web pages are described in various formats. FIG. 3 shows an example of a Web page used in the present embodiment. As is shown in FIG. 3, the Web page 21 includes description for downloading a communication applet, e.g., <applet codebase="http://local Web server/applet/" code="communication applet.class" width=0 height=0>. In a word, the local Web server in the terminal device 1, in which the Web page 21 is downloaded, is designated in the Web page 21 as a download source of the applet. Note that in FIG. 3, "external Web server" indicates an address (name) of an external server such as "www xyz.co.jp".

Figure 4:
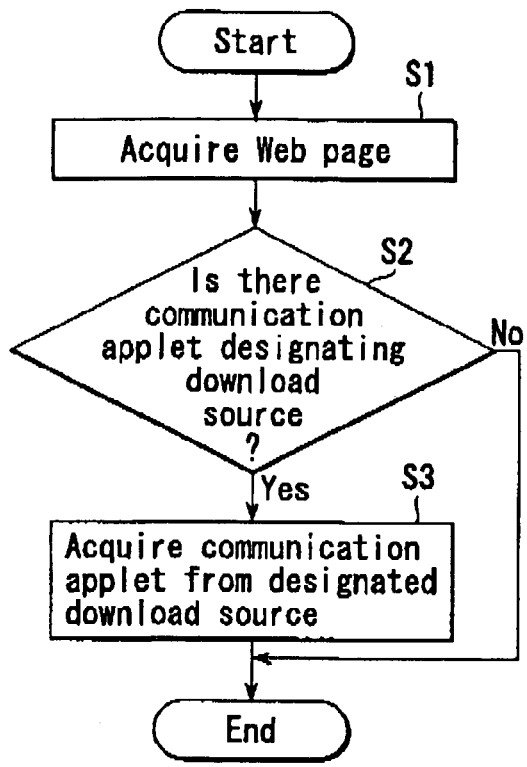
FIG. 4 is a flow chart showing an example of a processing procedure for a Web page according to the embodiment.

FIG. 4 illustrates an example of the processing procedure of the Web browser 11 in the case where acquisition of a Web page is instructed. A designated Web page is acquired (upon a user's instruction to acquire a Web page) (step S1). If a communication applet that designates a download source is embedded in the acquired Web page (step S2), the communication applet is acquired from the designated download source (step S3). The acquired communication applet is executed in association with the Web page. This procedure may be executed prior to display of the acquired Web page, or after completion of display, or independent from display.

Figure 5:
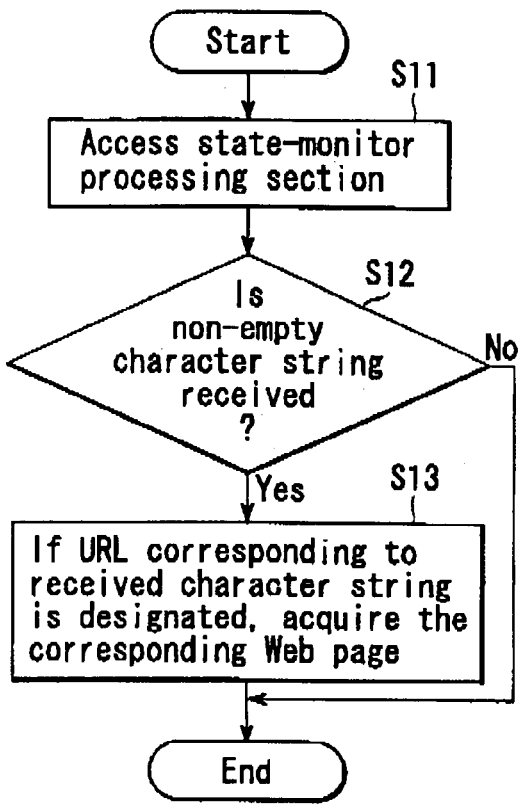
FIG. 5 is a flow chart showing an example of a processing procedure of a communication applet according to the embodiment.

FIG. 5 shows an example of the processing procedure of the application applet 121. The procedure illustrated in FIG. 5 is periodically repeated while the communication applet 121 is running. The state-monitor processing section 14 is accessed (when a time to access the state-monitor processing section 14 has come, for example, on the basis of a timer) (step S11). If the communication applet 121 receives information from the state-monitor processing section 14 to the effect that an empty character string is received or a character string is absent (step S12), no processing is performed. Even where a non-empty character string is received from the state-monitor processing section 14 (step S12), if a URL corresponding to the received character string is not designated no processing is performed. However, in the case where a non-empty character string is received from the state-monitor processing section 14 (step 512), if a URL corresponding to the received character string is designated, the corresponding Web page is acquired (step S13). In this example, if the corresponding Web page is acquired and displayed, the execution of the communication applet 121 corresponding to the original Web page is suspended.

Figure 6:
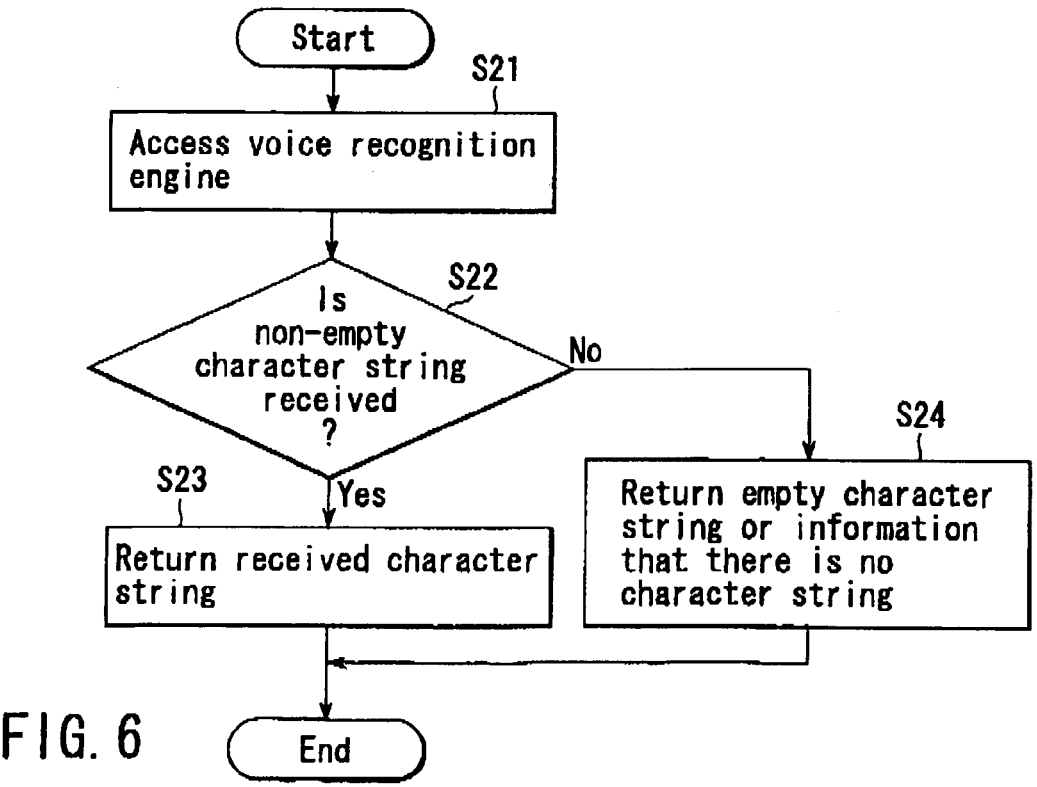
FIG. 6 is a flow chart showing an example of a processing procedure of a state-monitor processing section according to the embodiment.

FIG. 6 illustrates an example of a processing procedure of the state-monitor processing section 14 in the case where it is accessed by the communication applet 121. The state-monitor processing section 14 accesses the voice recognition engine 13 (when it is accessed by the communication applet 121) (step 121). If the state-monitor processing section 14 receives a non-empty character string front the voice recognition engine 13 (step S22), it returns the character string to the communication applet 121 (step S23). On the other hand, when the state-monitor processing section 14 receives an empty character string or information that there is no character string from the voice recognition engine 13 (step S22), it returns the empty character string or the information that there is no character string to the applet 121 (step S24).

Figure 7:
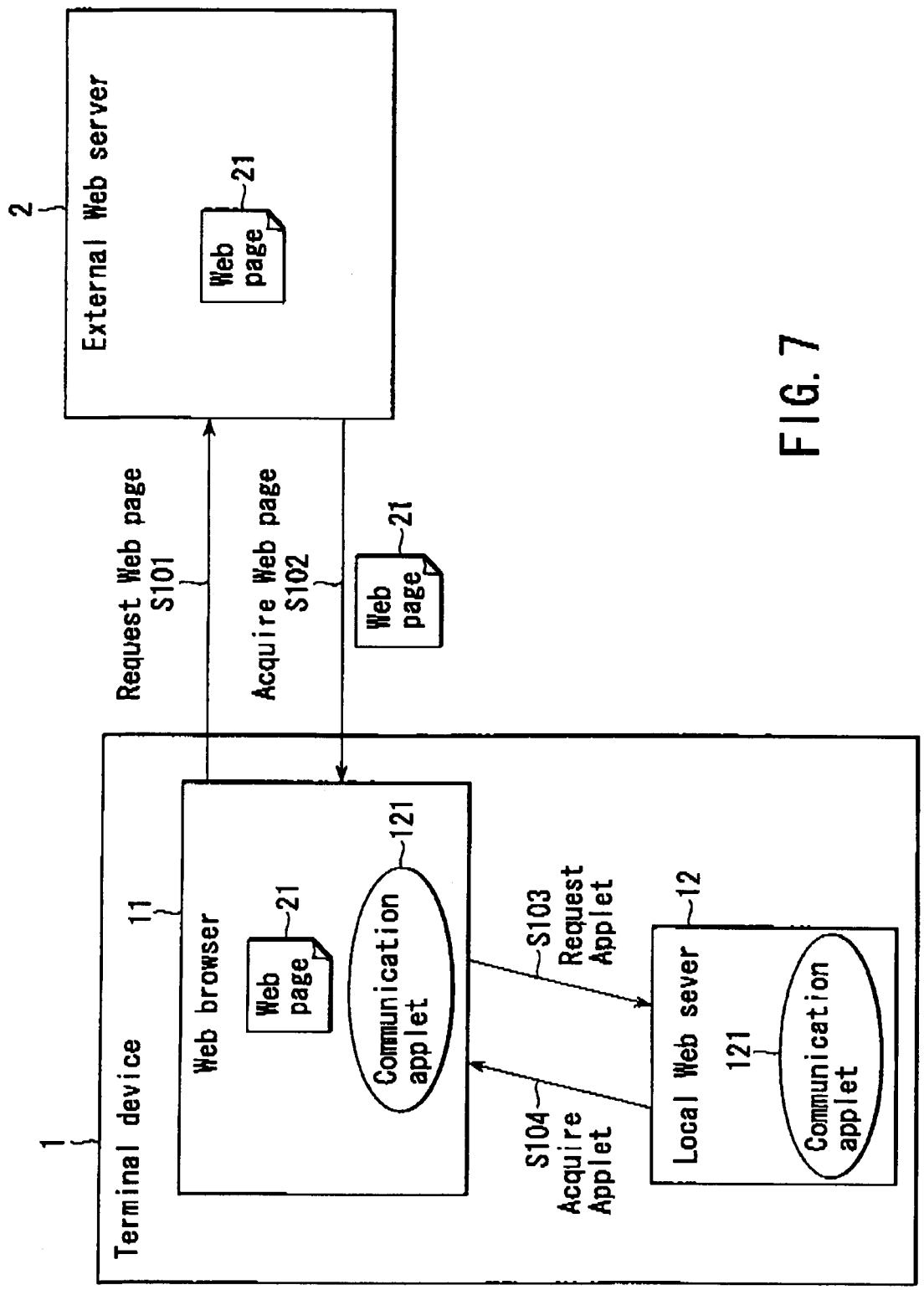
FIG. 7 is a view for explaining an example of a process flow from a request for a Web page to acquisition of a communication applet in the embodiment.

Referring now to FIG. 7, a process flow from the request for a Web page to the acquisition of the communication applet will be described.

FIG. 7 shows a state in which the user of the household terminal device 1 accesses, from the Web browser 11 of the terminal device 1, a Web page (refer to the Web page shown in FIG. 3) in the external Web server 2, which is designated by "http://external Web server/html/startpage.html".

To begin with, the user requests the Web page of interest from the external Web server 2 via the Web browser 11.

The Web browser 11 makes an access request at URL "http://external Web server/html/startpage.html" of the external Web server 12 (see 5101 in FIG. 7). Then, the designated Web page 21, i.e. "startpage.html", is downloaded in the Web browser 11 (see S102 in FIG. 7).

In the Web page 21, a description of a communication applet, which explicitly designates a download source, like "codebase="http://local Web server/applet/" code="communication applet.class", is embedded. In this case, immediately after downloading the Web page 21, the Web browser 11 accesses the following URL of the local Web server 12 (not of the external Web server 2): http://local Web server/applet/communication applet.class (see S103 in FIG. 7). As mentioned above, the communication applet 121 is located in this URL. Thus, the communication applet 121 stored in the local Web server 12 is downloaded in the Web browser 11 (see S104 in FIG. 7).

When the Web page 21 is to be transmitted from the Web server 2 to the household terminal device 1, it is assumed that the external Web server 2 has such information that the local Web server 12 is built in the household terminal device 1, and also has information as to what functions the communication applet 121 located in the local Web server 12 has and information as to the interface, location, etc. of the communication applet 121.

In general, these pieces of information vary from terminal device to terminal device. For example, cookies may be used as means for pre-storing the information in the external Web server 2. When the Web browser 11 issues to the external Web server 2 a request for acquiring the Web page 21, it sends a cookie at the same time. In the cookie, described is necessary information on functions of the communication applet 121 set in the local Web server 12, and on the interface and location of the communication applet 121. The external Web server 2 can acquire necessary information from the cookie sent from the Web browser 11. If the external Web server 2 stores information on each terminal device as a database, only such information as to discriminate the terminal device may be described in the cookie sent from the Web browser 11.

The downloaded communication applet 121 is executed on the Web browser 11. It should be noted, however, that the communication applet 121 is set at a width=0 and a height=0 (refer to the portion in FIG. 3, <applet codebase="http://local Web server/applet/" code="communication applet.class" width=0 height=0>), and thus the communication applet 121 is not viewed on the Web browser 11, while it is being executed, and is not recognized by the user. Alternatively, the width and height may be set at values greater than 0, so that the user can visually recognize the communication applet 121.

For reasons of security, a communication applet is communicable with only the source of download of the communication applet. The communication applet 121 downloaded from the local Web server 12 in the terminal device 1 can communicate with (only) the state-monitor processing section 14 provided in the same terminal apparatus 1 as the local Web server 12, which is the download source. Based on the communication by the communication applet 121, the present embodiment is configured to reflect on the Web browser 11 the information on the external state, i.e. the recognition result of the voice recognition engine 13 in this embodiment, via the state-monitor processing section 14.

Figure 8:
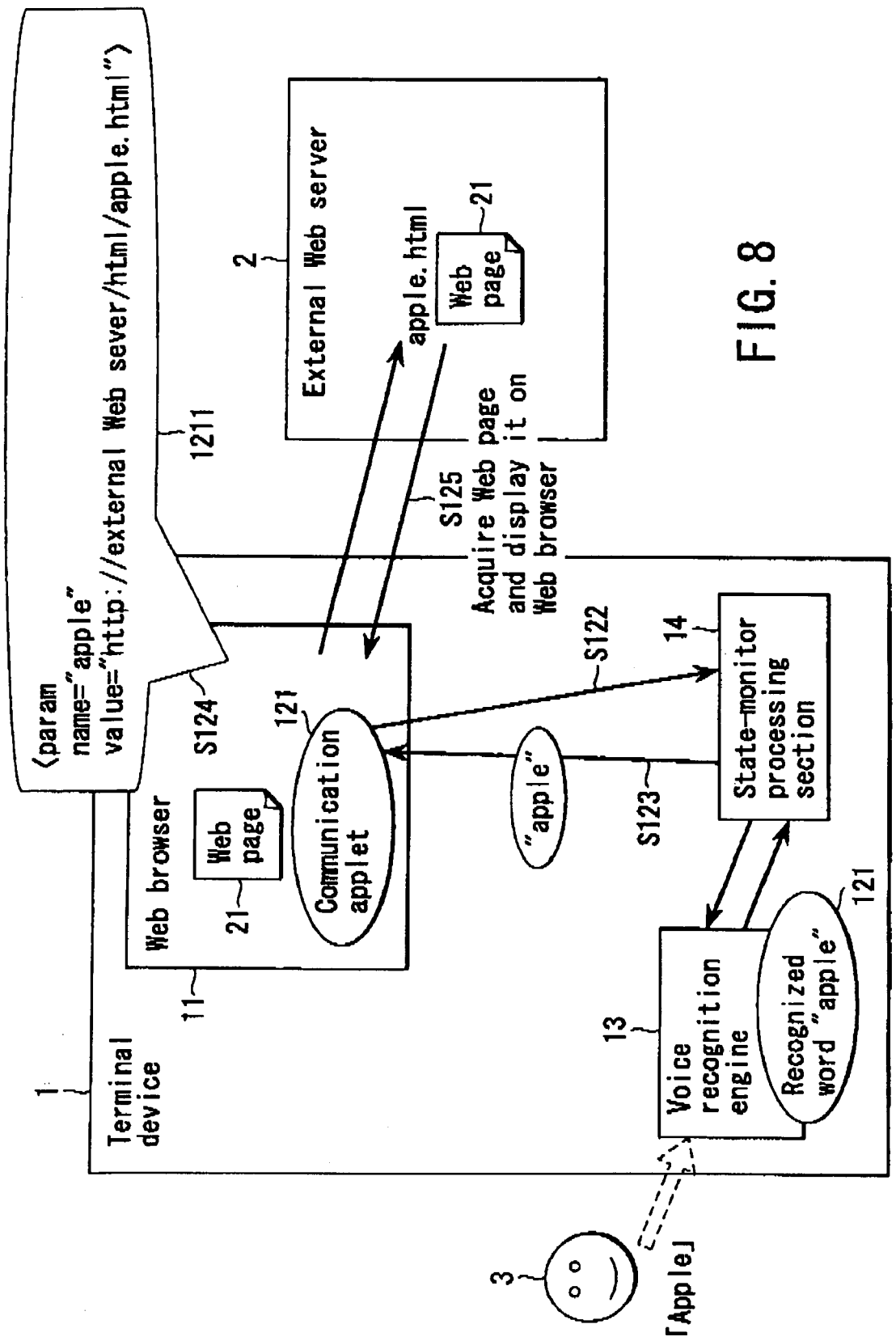
FIG. 8 is a view for explaining an example of a predetermined process relating to a Web page, which is based on information relating to an external state in the present embodiment.

Referring to FIG. 8, a description will now be given of communications between the communication applet 121, state-monitor processing section 14 and voice recognition engine 13, and the function of Web page jump by voice input, as an example of a predetermined process relating to a Web page based on information on an external state.

For example, the Web page 21 shown in FIG. 3 is displayed on the display screen (not shown) of the Web browser 11 of household terminal device 1. The display screen also displays character strings "apple" (Japanese), "orange" and "strawberry". If a user (3) selects a given character string (e.g. "apple"), the Web browser 11 accesses the associated server according to the description of a hyperlink (>a href= . . . > in FIG. 3), acquires the corresponding Web page, and displays it on the display screen as a new Web page.

When the user (3) selects "apple" as a freely chosen character string, the user (3) may manually click a display image portion of "apple" on the display screen using a mouse, or may utter voice "apple" instead of clicking. The voice is recognized by the voice recognition engine 13, and the recognized result is reflected on the Web browser 11 via the state-monitor processing section 14 under the operation of the communication applet 121. Thus, the Web page is jumped to the following page designated by "apple":

http://external Web server/html/apple.html.

Assume that the user (3) of terminal device 1 viewed a Web page displayed on the display screen, and then desired to browse a Web page designated by "apple" and uttered "apple". The voice recognition engine 13 memorizes, as a character string, a word recognized based on the user's uttered voice (refer to S121 in FIG. 8).

On the other hand, the communication applet 121 periodically perform polling to determine the status of the state-monitor processing section 14 (refer to S122 in FIG. 8). The polling is done, for example, to determine whether there is a recognized character string.

Each time the state-monitor processing section 14 is accessed by the polling, it inquires of the voice recognition engine 13 as to what word (character string) has been recognized. If the voice recognition engine 13 has a voice recognition result, it stores a character string. In response to the inquiry from the state-monitor processing section 14, the voice recognition engine 13 returns the character string. The state-monitor processing section 14 returns the character string as a response to the communication applet 121 (refer to S123 in FIG. 8). If the voice recognition engine 13 recognizes nothing (i.e. if the voice recognition engine 13 returns information that nothing is recognized, for example, by an empty character string), the state-monitor processing section 14 returns, e.g. an empty character string, thereby notifying the communication applet 121 that nothing is recognized.

In this communication applet 121, as exemplified by numeral 1211 in FIG. 8, arguments are designated, each of which indicates correspondence between a received character string and an associated URL-designated Web page to be displayed (refer to examples of "apple", "orange" and "strawberry" in FIG. 3). If a character string, which the communication applet 121 received from the state-monitor processing section 14, is included in these arguments (see S124 in FIG. 8), the communication applet 121 causes the Web browser 11 to display the corresponding URL.

In the example of FIG. 3, when the voice recognition engine 13 recognizes "apple", for instance, the communication applet 121 receives a character string "apple" via the state-monitor processing section 14, and a Web page of the following URL is displayed (see S125 in FIG. 8):

http://external Web server/html/apple.html.

Similarly, when the word "orange" is recognized, the URL, http://external Web server/html/orange.html is displayed.

When the word "strawberry" is recognized, the URL, http://external Web server/html/strawberry.html is displayed.

On the other hand, the Web page is not changed, if the communication applet 121 receives information that there is no character string, e.g. an empty character string, or the communication applet 121 receives a character string that is not designated by the arguments.

There are three modes of selection of a desired character string in connection with each Web page: (1) either manual input, e.g. by clicking a character string on the display screen using a mouse, or voice input, (2) only voice input, and (3) only manual input.

In the above embodiment, the English language is the object of recognition by the voice recognition engine 13. Needless to say, other languages, e.g. Japanese, may be recognized, or one or more of a plurality of languages may be recognized.

In the above description, URLs are directly associated with "apple", "orange" and "strawberry". Alternatively, the display screen may be caused to display "1: apple", "2: orange" and "3: strawberry", the user may generate a numeral corresponding to the desired item, and the Web page corresponding to the recognized numeral may be acquired (it is also possible to adopt a method that can cope with either a case where the user generates a numeral corresponding to the desired item or a case where the user generates a character string corresponding to the desired item).

In the case where a new Web page is acquired and displayed on the Web browser 11 by using the voice recognition, etc., such a new Web page may be associated with a given URL (a description of a communication applet that explicitly designates a download source may, or may not, be embedded in a new Web page). However, because of restrictions due to security of a Java® applet, the content of a new Web data, which is received from a source other than the download source of the applet, cannot directly be referred to from the communication applet 121 corresponding to the original Web page.

If the Web page is changed, the communication applet embedded in the original Web page is stopped. However, if the description of the same communication applet is embedded in a new Web page at a destination of transition, e.g. the above-mentioned http://external Web server/html/apple.html, communication between the same communication applet and state-monitor processing section begins on the Web page at the destination of transition, and the operation can be continued.

As described above, the communication applet embedded in the Web page communicates with the state-monitor processing section that operates on the Web server at the download source of the communication applet. Thereby, a given web page can dynamically be displayed on the Web browser in accordance with the state (or change of state) detected by the state-monitor processing section.

As has been described above, even in the method of embedding the description of the communication applet in each Web page, if the same communication applet is used on the Web page at the destination of transition, the communication applet need not be downloaded each time. The reason is that, in general, once a communication applet is downloaded, the duplicate stored in the cache is used in subsequent operations. However, an overhead may possibly occur each time the communication applet is initiated.

There is a method of avoiding an overhead due to start of the communication applet.

Figure 9A:
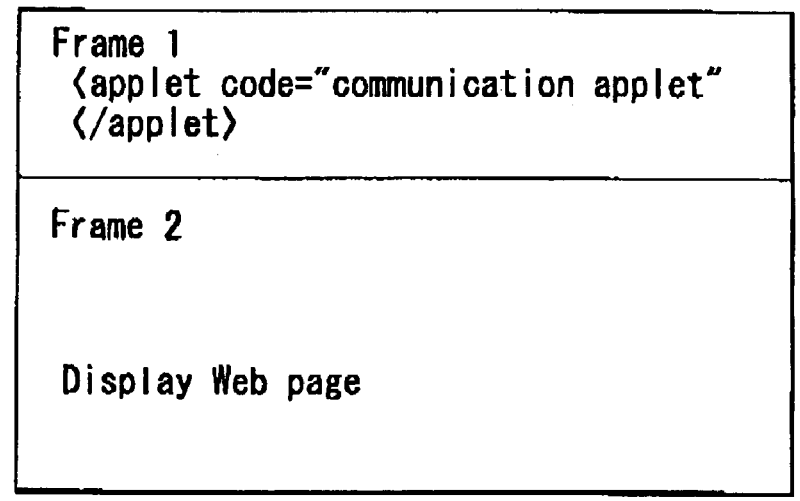
FIG. 9A and FIG. 9B are views for explaining a case of making use of a page comprising a plurality of frames according to the embodiment.

Specifically, the same communication applet is kept on running. As is shown in FIG. 9A, a page (e.g. first page) is composed of a plurality of pages, e.g. frame 1 and frame 2.

The description of the communication applet is embedded in a Web page displayed in frame 1. A new Web page, which is opened according to a change in status, is displayed in frame 2 (the provision of frame 3, . . . , is possible alternatively). With this configuration, frame 1 is unchanged even if the Web page in frame 2 transits to the new page. Thus, the communication applet is not stopped and keeps on running.

Figure 9B:
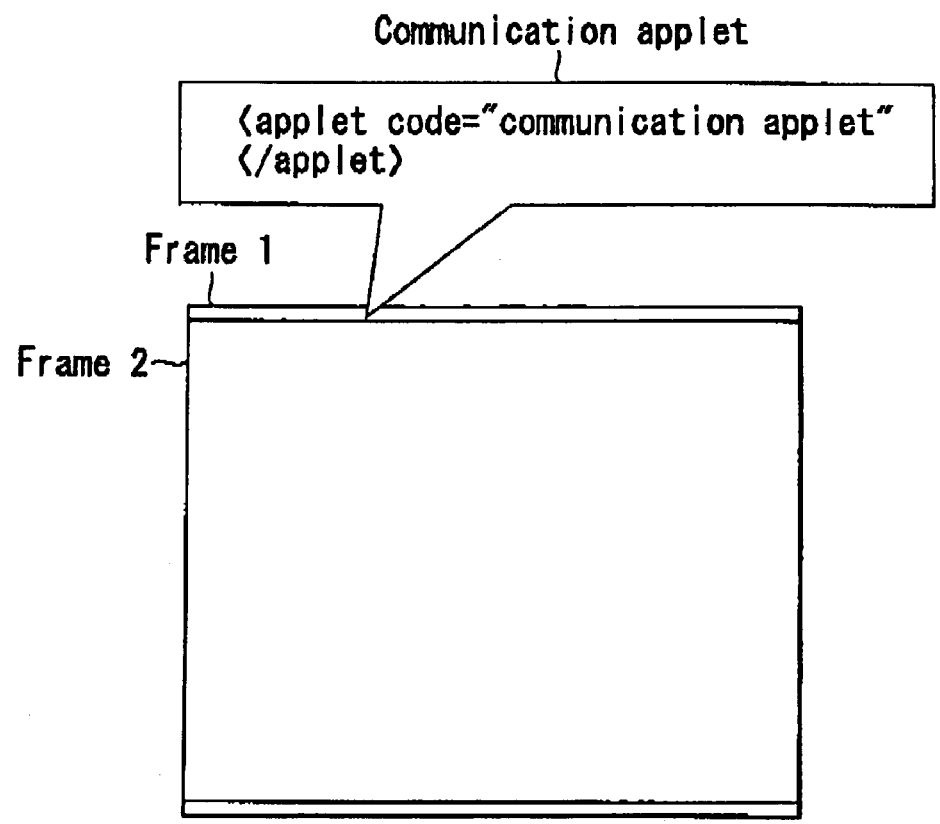

As is shown in FIG. 9B, the frame is not necessarily be displayed as an easily recognizable frame. The frame may be formed with a width=0 or a height=0. In this frame, the communication applet may be run so that the display of the frame may not easily recognized by the user.

Figure 10:
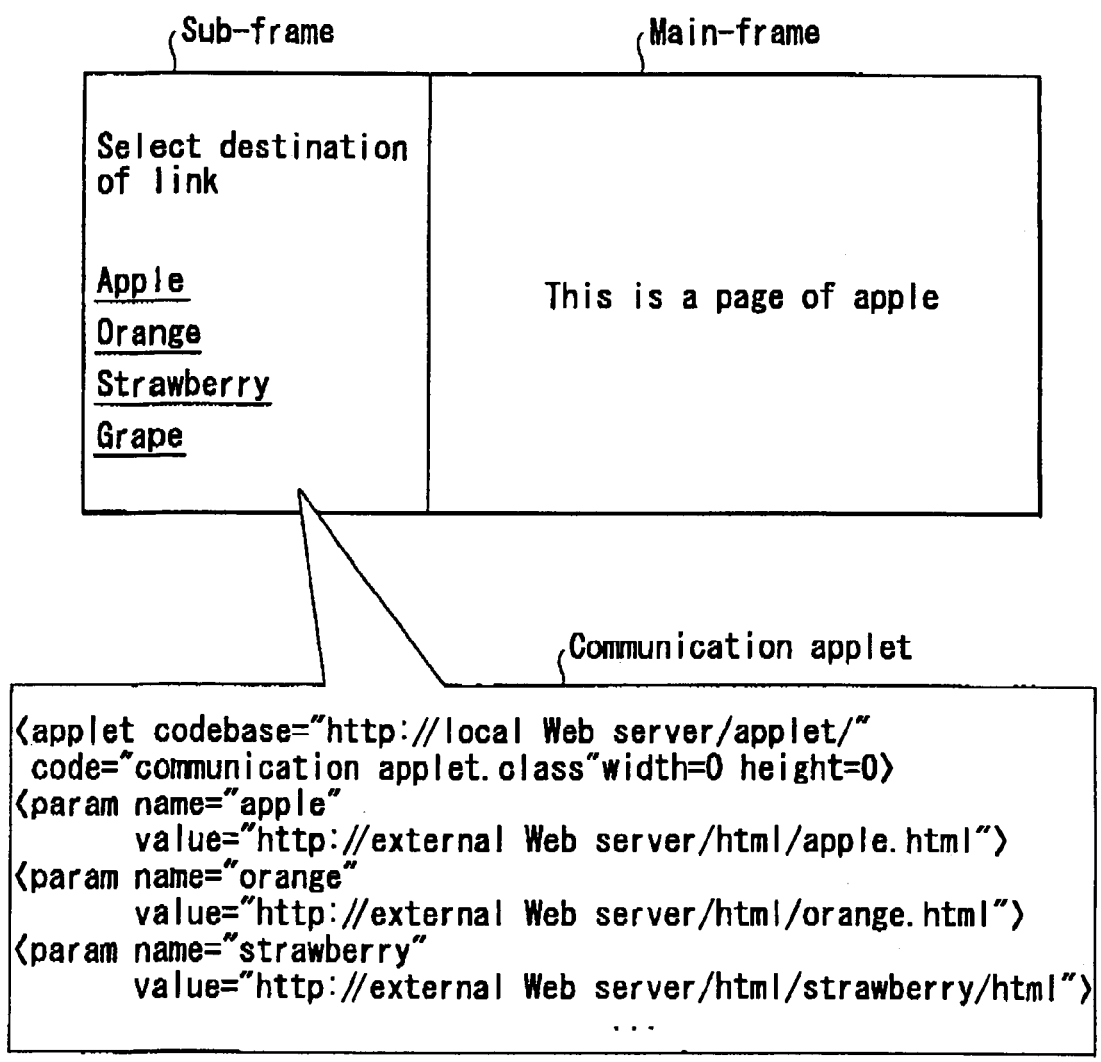
FIG. 10 is a view for explaining a case of making use of a page comprising a plurality of frames according to the embodiment.

The method of keeping the same communication applet running by using frames is particularly effective for a page structure, as shown in FIG. 10, that is generally adopted in Web pages using frames, wherein items of link to each page appears on a sub-frame and the associated content appears on a main frame (in this case, as shown in FIG. 10, the communication applet (resident applet) is run in the sub-frame). The reason is that link destination candidates are understood at the time of first displaying the whole frame including the sub-frame, so they can be registered as arguments at the time of start of the communication applet.

Figure 11:
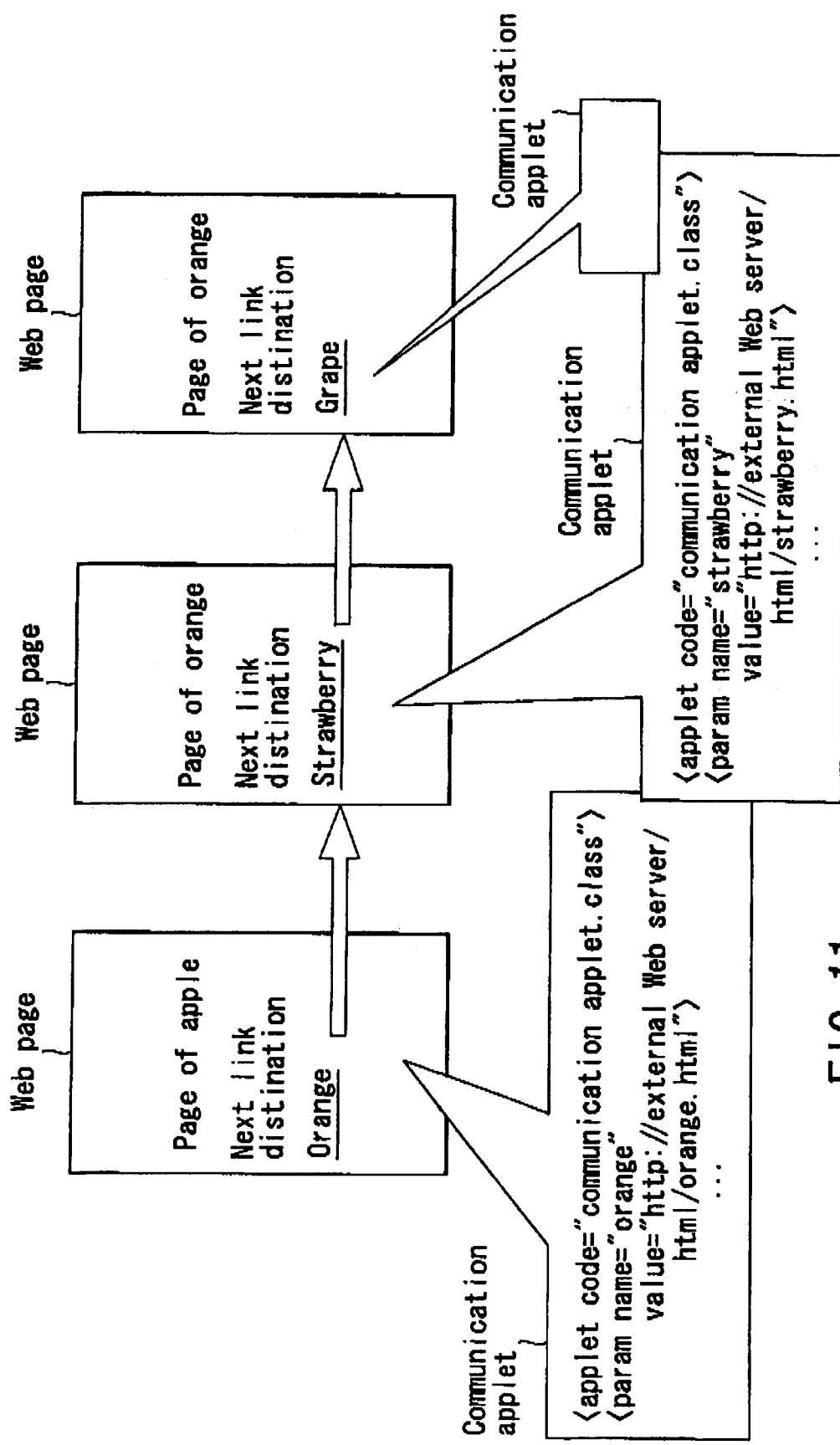
FIG. 11 is a view for explaining a case of making no use of a page comprising a plurality of frames according to the embodiment.

On the other hand, in the case of a page structure wherein new link destinations are successively displayed each time a new page is opened, as indicated by (a)→(b)→(c) in FIG. 11, all link destinations are not understood at the time of start of the communication applet. In such a case, if continuous execution of the same communication applet is desired, such a configuration as to dynamically pass arguments to the communication applet may be added and the arguments may be used. Alternatively, the communication applet may be embedded in all pages, as mentioned above.

The above-described method of embedding the description of the communication applet in each Web page or the method of using the frames as illustrated in FIG. 9 may be properly selected and used.

In the example described above, the Web page, as shown in FIG. 3, in which the descriptions of the communication applet and associated arguments are embedded, is prepared in advance. In an example to be described below, the description of the communication applet is added to the Web page in a device other than the Web server 2, thereby forming the Web page as shown in FIG. 3.

Figure 12:
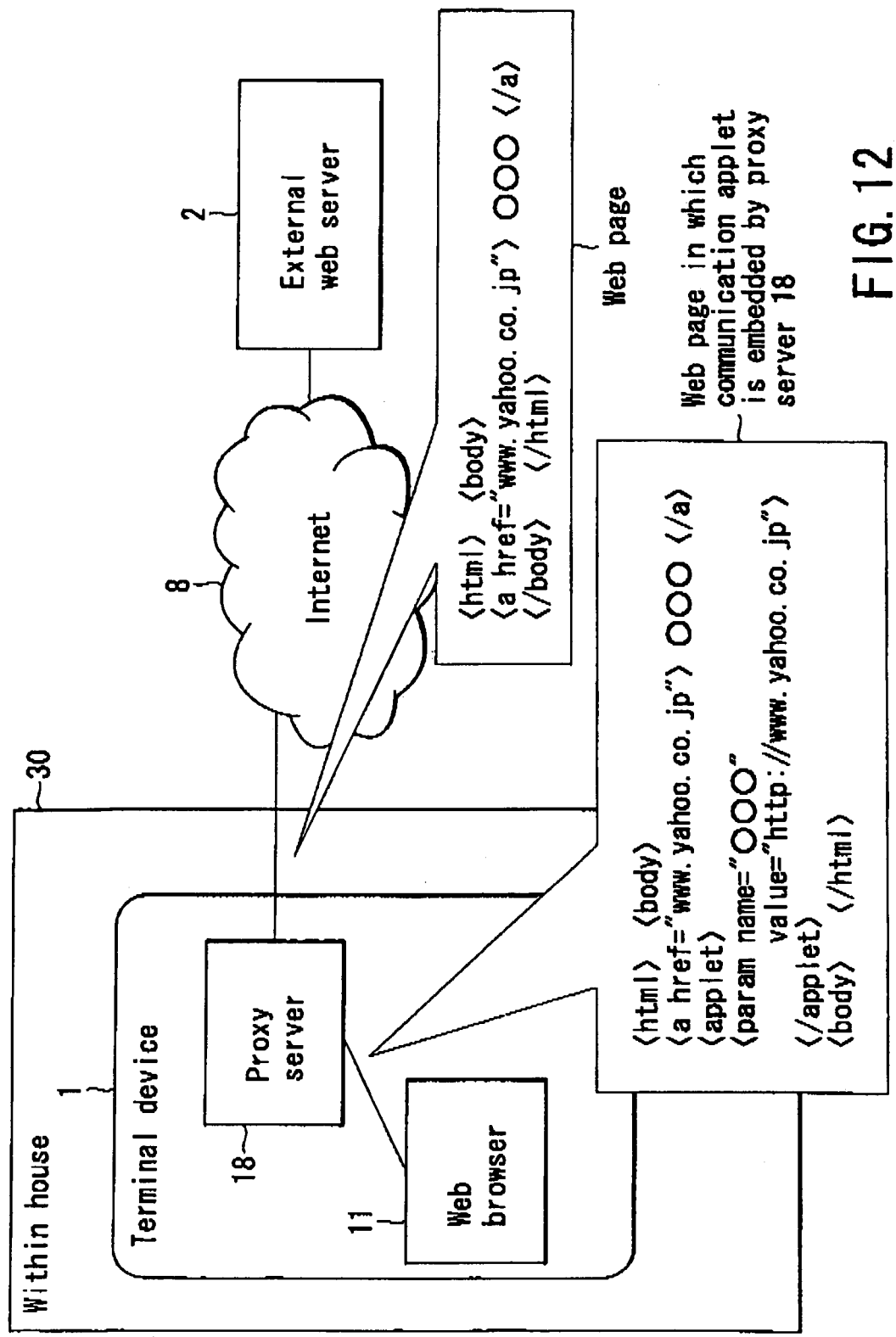
FIG. 12 shows another example of the structure of the whole network system according to the embodiment.

FIG. 12 shows an example of the structure of this technique. In FIG. 12, a proxy server intervenes between the external Web server 2 and Web browser 11. Before a Web page acquired from the external Web server 2 is displayed, the description of the communication applet is embedded in the Web page by the proxy server 18. If appropriate Web page conversion is not effected, Web surfing by voice input can be realized for a given Web page in a given Web server.

In this case, for example, a tag <applet> of a communication applet is embedded in a Web page of interest. A set of a character string, which is interposed between link-designating tags, (a href= . . . > . . . </a> included in the Web page, and a destination of the link, is given as arguments of the communication applet.

In the example described above, the local Web server is the download source of the communication applet. In an example to be described below, some other device is designated as the download source.

A freely chosen Web server can be designated as the download source of the communication applet. For example, a server located remote from the household terminal device 1 may be designated, and different Web pages may be opened according to the state (or change of state) of the remote place.

Figure 13:
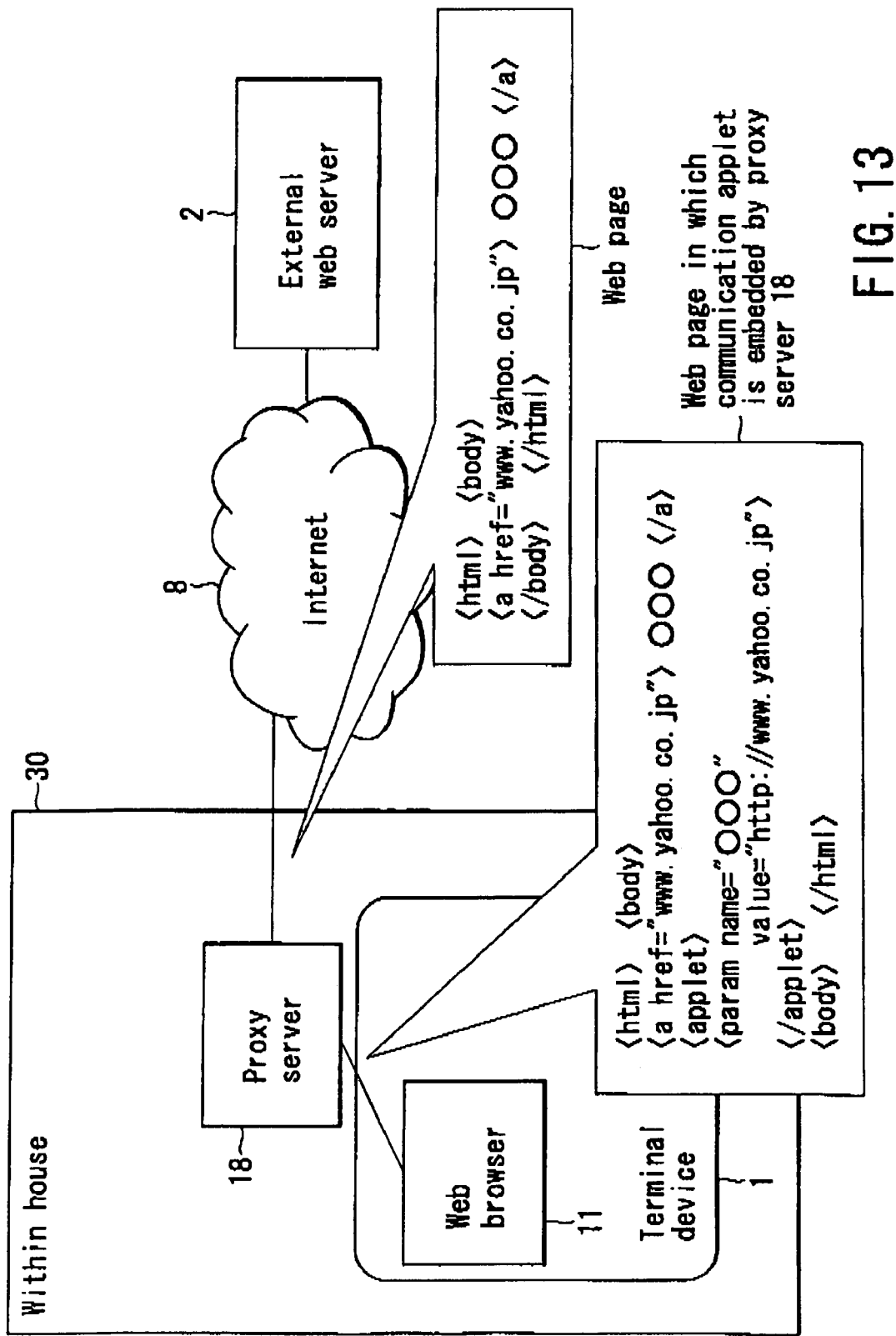
FIG. 13 shows still another example of the structure of the whole network system according to the embodiment.

The proxy server in FIG. 12 is an example of the server provided within the terminal device. The proxy server, however, may be located anywhere. For example, as shown in FIG. 13, a proxy server may be provided independently at the entrance of a household network (household LAN) provided within the house (in this case, the proxy server being transparently available by the user in the home). Alternatively, a proxy server may be provided en route over the Internet. Alternatively, a proxy server may be provided at the exit of the external server (in this case, the proxy server being transparently available by user who accesses it).

Figure 14:
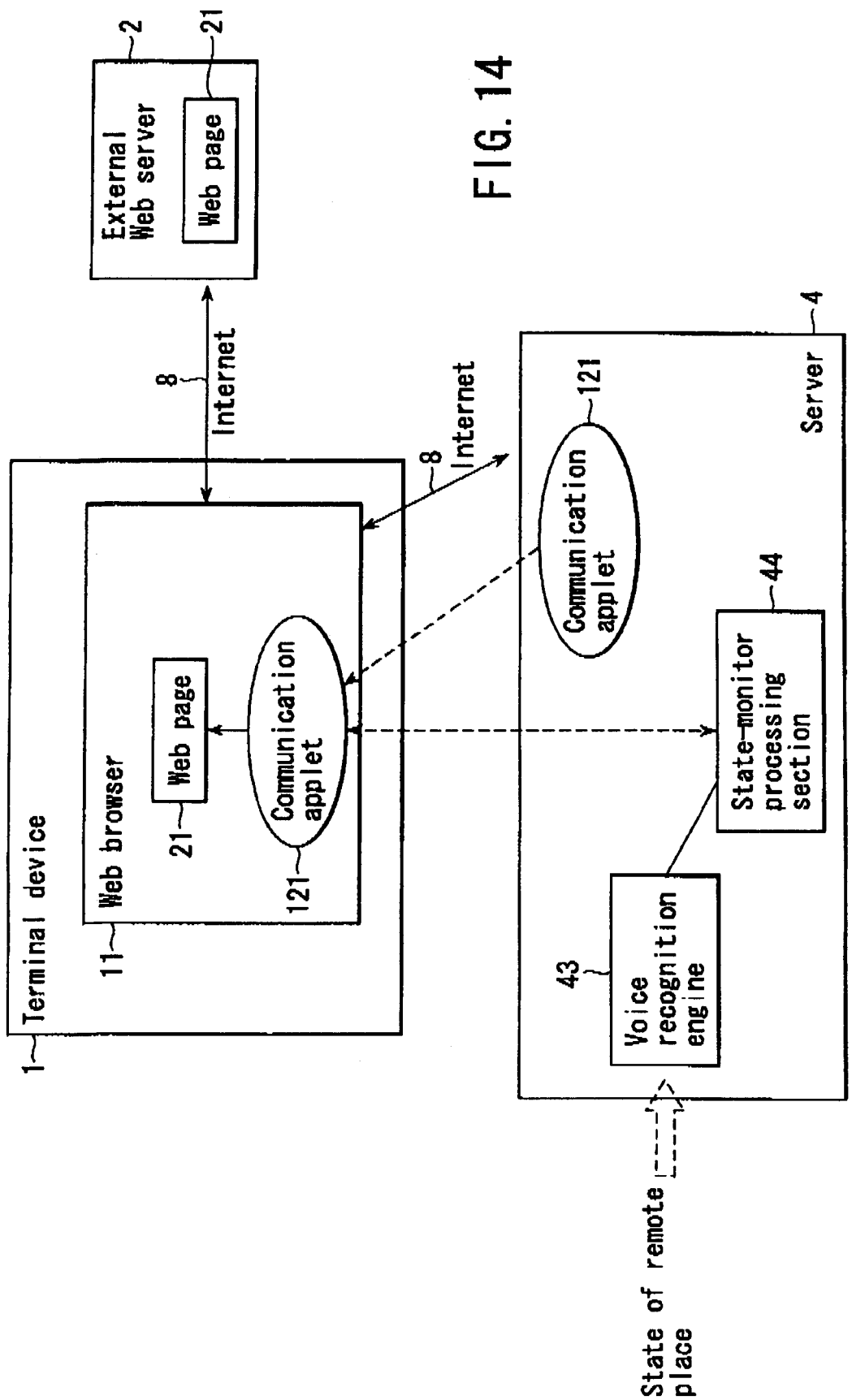
FIG. 14 shows still another example of the structure of the whole network system according to the embodiment.

FIG. 14 shows an example of the network system configuration in this case. A server 4 is located remote from the household terminal device 1. Like the local Web server 12, the server 4 has a function of providing the communication applet 121 to the terminal device 1. In addition, the server 4 includes the same processing engine 43, such as the voice recognition engine, and state-monitor processing section 44 as have been described above. In this case, the communication applet 121, which runs on the Web browser 11 of terminal device 1, communicates with the state-monitor processing section 44 of server 4. In the server 4, the state-monitor processing section 44 communicates with the processing engine 43. Thus, the communication applet 121 in the terminal device 1 can acquire information on the external state of the remote server 4.

In this case, if HTTP is used for communication between the communication applet 121 and state-monitor processing section 44, the configuration of the state-monitor processing section 44 can be used in such an environment that data communication based on protocols other than HTTP is blocked indoors or outdoors for the purpose of security.

In the case or using HTTP, the state-monitor processing section 44 may be used as a cgi (common gateway interface). The communication applet 121 sends a request to the cgi as an HTTP request, and receives a character string obtained by the state-monitor processing section 44 as an HTTP response.

In the case where the state-monitor processing section 44 is remotely located, a traffic between the communication applet 121 and state-monitor processing section 44 may become a problem. In the example shown in FIG. 8, each time the communication applet 121 issues a request, the state-monitor processing section 14 returns some character string generated by the voice recognition engine 13. The communication applet 121 determines, based on the character string, whether transition of the Web page should be made or not. Instead, for example, at the time of activating the communication applet 121, arguments given to the communication applet 121 may be sent to and registered in the state-monitor processing section 44. Even when some processing result (e.g. some character string from the voice recognition engine) is generated by the processing engine 43, the state-monitor processing section 44 may return information that there is no processing result (e.g. the absence of a character string, e.g. by an empty character string) in cases other than the registered arguments (e.g. registered character strings). By such new architecture for registration and deletion of character strings, the traffic can be reduced. This architecture is applicable to the case of FIG. 8.

In the example that has been mainly described above, a predetermined process relating to a Web page is performed when the acquired information relating to an external state coincides with preset information on an external state. Alternatively, a predetermined process relating to a Web page can be performed on the basis of transition of information relating to an external state. For example, at least information relating to an external state, which is the latest acquired information, is stored. When a transition of an information set of the latest information relating to an external state and the next latest information relating to an external state, which is stored at that time, coincides with a preset transition of information relating to an external state, a predetermined process relating to a Web page may be performed (e.g. a Web page with a URL corresponding to the transition content is acquired). Specifically, assume that URL 1 is designated to a transition "word A→word B", URL 2 to a transition "word A→word C", and URL 3 to a transition "word A→word D". In this case, assume that the user first generates word A and then generates word B in the state that word A is recognized, and the word B is then recognized. Then, a Web page with URL 1 corresponding to the transition "word A→word B" is acquired (i.e. if the user generates word A and word B in this order, the Web page with URL 1 can be acquired and displayed). Other various modifications can also be made.

Figure 15A:
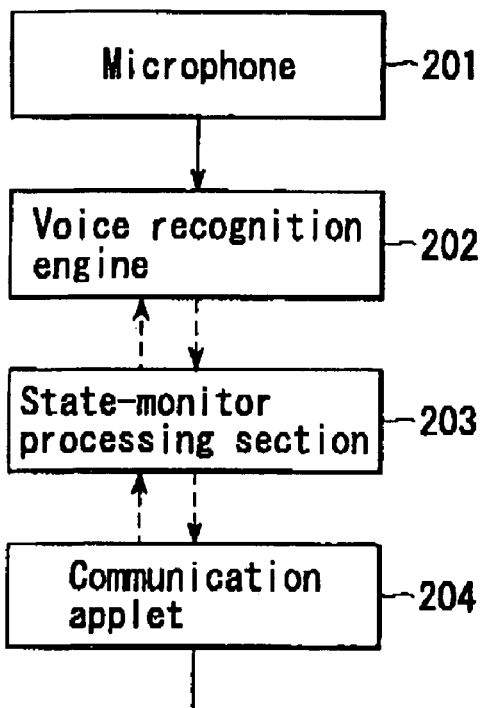
FIGS. 15A through 15D are views for explaining variations of a processing engine according to the embodiment.

In the embodiment described above, the description has been given of the function (processing engine) for acquiring information relating to an external state on the basis of information that the household terminal device 1 receives from the interface with the outside. In addition, the terminal device 1 has been described as being able to perform the process relating to the Web page in response to information relating to the external state. As a concrete example, recognition of voice uttered by the user, as shown in FIG. 15A, was described. Other variations, aside from the voice recognition, are possible with respect to how to acquire information relating to the external state.

Figure 15B:
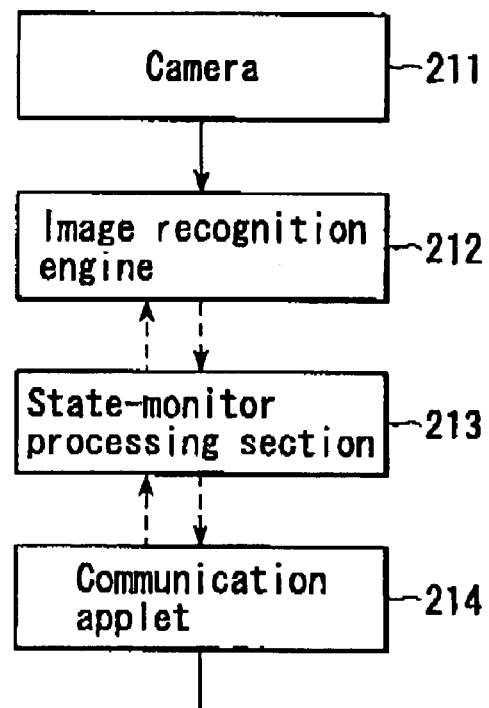

For example, by using an image recognition function as shown in FIG. 15B, an image recognition result can be used as information relating to an external state. There may be various objects of image recognition. An expression produced by the user by, e.g. a sign language or lip reading, is read and a corresponding character string is generated. The generated character string can be used. Besides, the user may perform a predetermined specific action pattern, and the action pattern is recognized and used. Further, predetermined characteristic amounts (e.g. brightness, typical color, rapid motion) may be extracted from an acquired image of the surrounding, and a predetermined process relating to the Web page may be performed based on the extracted result.

Figure 15C:
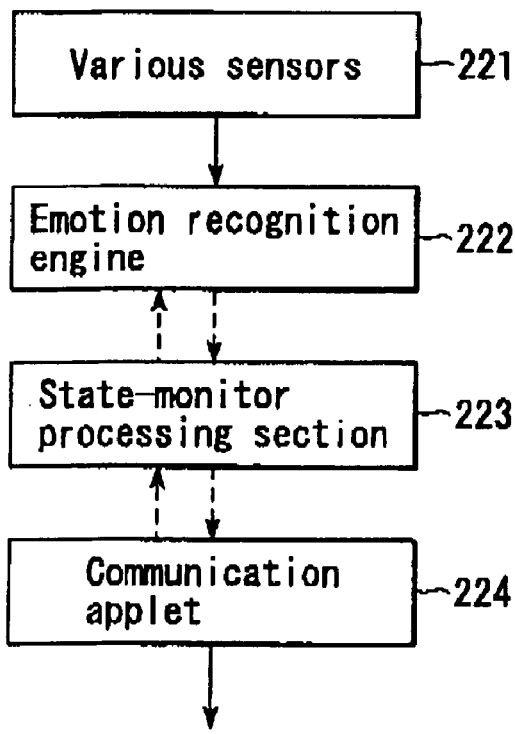

As is shown in FIG. 15C, by using a function of emotion recognition for the user, e.g. guessing delight, anger, sorrow and pleasure of the user at the time, based on the voice recognition of the user's voice and the image recognition of a face image of the user, an emotion recognition result can be used as information relating to the external state.

Figure 15D:
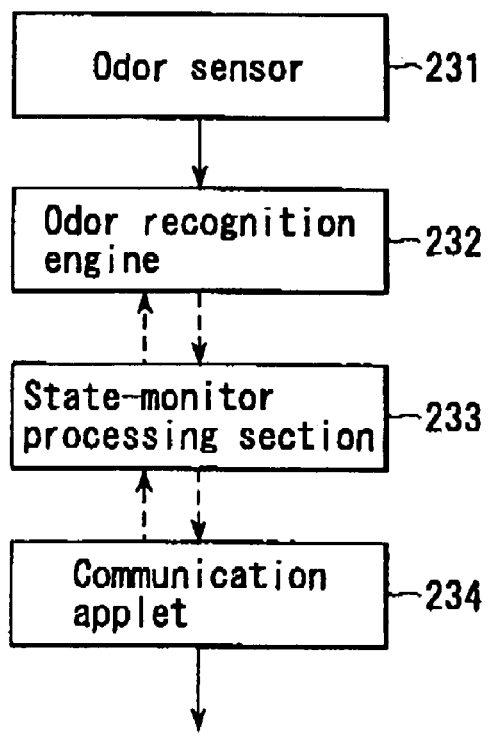

As is shown in FIG. 15D, by using an odor recognition function using an odor sensor, an odor recognition result can be used as information relating the external state.

In the above descriptions, the terminal device 1 connected to the household network is connected to the Internet via the household network. Of course, the invention is not limited to this configuration. In this invention, the terminal device, which is connected to a network other than the household network (e.g. an intranet, a mobile phone service provider's network, or an Internet provider's network) may be connected to the Internet via the network. Furthermore, the invention is also applicable to a terminal device directly connected to the Internet.

The functions described above are realizable as software.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication apparatus for acquiring and displaying Web pages, comprising:
   a communication applet storing unit configured to store a communication applet, the communication applet being referenced, but not stored, on a remote Web server;
   a monitoring unit configured to monitor an external state and to generate a first operation information responsive to the external state; and
   a Web browser configured to receive a first Web page from the remote Web server and display the first Web page on a screen, and configured to download the communication applet from the communication applet storing unit and execute the communication applet when the first Web page is displayed,
   wherein:
   the first Web page includes an instruction for causing the Web browser to download the communication applet from the communication applet storing unit and an argument which is passed to the communication applet and indicates that a second Web page for display corresponds to a second operation information;
   the communication applet is restricted from communicating with devices external to the communication apparatus;
   the communication applet can only control the Web browser to replace the first Web page with the second Web pane if the first operation information received from the monitoring unit corresponds to the second operation information indicated in the first Web page.

2. The apparatus according to claim 1, wherein the operation information includes a character string which corresponds to a location of the second Web page.

3. The apparatus according to claim 1, further comprising a voice recognition unit connected to the monitoring unit and configured to recognize a voice and send a voice recognition result of the recognized voice as the external state to the monitoring unit.

4. The apparatus according to claim 1, wherein the Web browser executes the communication applet in a first frame and displays at least one of the first Web page and the second Web page in a second frame, and wherein the communication applet is resident in the first frame during a page transition between the first Web page and the second Web page.

5. The apparatus according to claim 4, wherein the first frame is invisible on the screen.

6. The apparatus according to claim 1, wherein the monitoring unit and the communication protocol communicate with each other in accordance with a HTTP protocol via a HTTP port.

\* \* \* \* \*

UNITED STATES PATENT AND TRADEMARK OFFICE
CERTIFICATE OF CORRECTION

| | |
|---|---|
| PATENT NO. | : 7,770,105 B2 |
| APPLICATION NO. | : 11/790007 |
| DATED | : August 3, 2010 |
| INVENTOR(S) | : Terashima et al. |

It is certified that error appears in the above-identified patent and that said Letters Patent is hereby corrected as shown below:

Claim 1, column 12, line 38, change "pane" to --page--.

Signed and Sealed this

Second Day of November, 2010

David J. Kappos
*Director of the United States Patent and Trademark Office*